(12) United States Patent
Qin et al.

(10) Patent No.: US 6,304,364 B1
(45) Date of Patent: Oct. 16, 2001

(54) ELASTOMERIC LIGHT VALVES

(75) Inventors: Dong Qin; Younan Xia, both of Seattle, WA (US); George M. Whitesides, Newton, MA (US)

(73) Assignee: President & Fellows of Harvard College, Cambridge, MA (US)

( * ) Notice: Subject to any disclaimer, the term of this patent is extended or adjusted under 35 U.S.C. 154(b) by 0 days.

(21) Appl. No.: 08/873,191

(22) Filed: Jun. 11, 1997

(51) Int. Cl.$^7$ ................................................ G02B 26/00
(52) U.S. Cl. .................... 359/291; 359/573; 359/530; 359/290; 345/84; 345/108
(58) Field of Search ........................ 359/290–296, 359/665, 227, 228, 573, 529, 530; 345/84, 85, 108; 362/320

(56) References Cited

U.S. PATENT DOCUMENTS

| | | | |
|---|---|---|---|
| 3,001,447 | * 9/1961 | Ploke | 359/292 |
| 3,238,296 | * 3/1966 | Nelson et al. | 359/291 |
| 3,641,354 | 2/1972 | DeMent | 250/216 |
| 3,654,846 | * 4/1972 | Wernikoff et al. | 359/230 |
| 3,716,359 | 2/1973 | Sheridon | 346/77 |
| 3,812,490 | * 5/1974 | Goodrich | 345/84 |
| 3,864,024 | * 2/1975 | Olson | 359/272 |
| 3,924,228 | * 12/1975 | Goodrich | 345/48 |
| 3,980,476 | 9/1976 | Wysocki | 346/77 |
| 4,001,635 | * 1/1977 | D'Auria et al. | 359/291 |
| 4,054,374 | * 10/1977 | Craig | 359/604 |
| 4,088,991 | * 5/1978 | Sachar | 359/292 |
| 4,119,368 | * 10/1978 | Yamazaki | 359/291 |
| 4,245,886 | * 1/1981 | Kolodzey et al. | 385/19 |
| 4,274,706 | 6/1981 | Tangonan | 370/1 |
| 4,382,657 | 5/1983 | Lemaitre | 264/19 |
| 4,502,758 | * 3/1985 | Bailey | 359/573 |
| 4,648,956 | * 3/1987 | Marshall et al. | 359/296 |
| 4,655,897 | * 4/1987 | Di Santo et al. | 359/296 |
| 4,729,636 | * 3/1988 | Te Velde et al. | 359/223 |
| 4,794,370 | 12/1988 | Simpson et al. | 348/825 |
| 4,807,967 | 2/1989 | Veenvliet et al. | 340/763 |
| 4,897,325 | 1/1990 | Akkapeddi et al. | 430/5 |
| 4,958,150 | 9/1990 | Dabbaj | 340/783 |
| 5,074,629 | * 12/1991 | Zdeblick | 359/665 |
| 5,132,675 | 7/1992 | Dabbaj | 340/764 |
| 5,181,016 | * 1/1993 | Lee | 345/84 |
| 5,204,772 | * 4/1993 | Hirata et al. | 359/296 |
| 5,500,761 | * 3/1996 | Goossen et al. | 359/291 |

(List continued on next page.)

FOREIGN PATENT DOCUMENTS

| | | | |
|---|---|---|---|
| 2044508 | * 10/1980 | (GB) | 359/291 |
| 552582 | * 5/1977 | (RU) | 359/291 |
| WO 96/29629 | 9/1996 | (WO) . | |

*Primary Examiner*—Evelyn A Lester
(74) *Attorney, Agent, or Firm*—Wolf, Greenfield & Sacks, P.C.

(57) ABSTRACT

Electromagnetic radiation valves are provided. In one system, a transparent, elastomeric article is provided having a contoured surface including protrusions and intervening indentations. The contoured surface is placed adjacent a transparent plate and a void pattern defined by indentations of the contoured surface is filled with an opaque fluid. The protrusions decrease in cross-sectional area in the direction in which they extend away from the bulk of the elastomeric article, thus compression of the elastomeric protrusions against the transparent plate results in an increase in surface area in elastomeric protrusions against the transparent plate due to deformation of the protrusions, and the opaque fluid is displaced from the voids. Increased transmission of the electromagnetic radiation results. In another system, a similar elastomeric article includes an array of corner cubes that are totally internally reflective of the electromagnetic radiation. Increased deformation of the protrusions of the transparent plate results in decreased total internal reflection of light, due to the progressive destruction of the corner-cube geometry, and the passage of light is increased with compression.

46 Claims, 6 Drawing Sheets

U.S. PATENT DOCUMENTS

| | | | | |
|---|---|---|---|---|
| 5,512,131 | * | 4/1996 | Kumar et al. | 156/655.1 |
| 5,627,561 | * | 5/1997 | Laspina et al. | 359/296 |
| 5,650,872 | * | 7/1997 | Saxe et al. | 359/296 |
| 5,754,338 | * | 5/1998 | Wilson et al. | 359/530 |
| 5,805,338 | * | 9/1998 | Janovec | 359/529 |
| 6,139,158 | * | 10/2000 | Nilsen et al. | 359/530 |
| 6,168,275 | * | 1/2001 | Benson et al. | 359/530 |
| 6,172,814 | * | 1/2001 | Watanabe et al. | 359/290 |
| 6,206,525 | * | 3/2001 | Rowland et al. | 359/530 |

* cited by examiner

COMPRESSIVE STRAIN

ELASTOMERIC LIGHT VALVES

This invention was supported by NSF Grant No. DMR-9400396 and PHY-9312572 and the government has certain rights in the invention.

FIELD OF THE INVENTION

The present invention relates generally to apparatus that controls the passage of electromagnetic radiation. More particularly, the invention relates to a system for controlling the amount of passage of light including an elastomeric article having a contoured surface that essentially entirely reflects light, but can be deformed to pass light, or a contoured surface that, when deformed, alters the amount of an opaque fluid residing adjacent the surface thereby controlling the passage of light.

BACKGROUND OF THE INVENTION

Controlling the passage of light is desirable in a variety of settings. For example, articles such as windows or sunglasses are desirably made in a manner allowing blockage or passage of light, controllably, to provide a desired amount of shade from sunlight. Optical displays are constructed and arranged to produce, or allow passage of, light in a predetermined, recognizable pattern, symbol, or series of symbols, for example in the form of written text, an advertisement or other sign. A variety of other systems are known for use in modulation, sensing, and recording using light.

Some known optical control systems or sensors use flexible components and/or fluids. U.S. Pat. No. 3,641,354 (De Ment) describes a system for optical modulation for use with optical computers, data processing, and optical information processing systems that includes a container, having at least one flexible wall, into which and out of which a liquid or gas can be pumped. One or more flexible walls of the container can be made convex or concave depending upon the fluid pressure within the container relative to fluid pressure outside of the container, or can be altered in configuration in other ways to focus, reflect, or otherwise alter light from a laser or incoherent light source.

U.S. Pat. No. 4,382,657 (Lemaitre) provides astronomical mirrors or aspherical gratings defined by a thin disk, having a reflecting surface, and a cylindrical ring on a support that is essentially parallel to and supports the disk, the system forming a cavity defined on one side by the disk. Control of the pressure of a fluid within the cavity, relative to pressure outside of the system, causes elastic flexion of the disk to create a concave or convex lens.

U.S. Pat. No. 4,274,706 (Tangonan) describes a flexible, reflective diffraction grating, for example made from a sheet of grooved, acetate plastic film including a reflective aluminum coating, positioned at a convexly-curved end of a waveguide. Light introduced through an input/output surface at an opposite end of the waveguide propagates to the curved end at which the grating is positioned, and light is diffracted by the grating and focused by the curved end back into the input/output end of the waveguide. The system can act as a coupler for wavelength multiplexing or demultiplexing of multimode optical signals in optical circuits.

U.S. Pat. No. 3,716,359 (Sheridon) describes the use of elastomers in various imaging systems for cyclic recording, storage, and erasure of optical information. One system involves a transparent substrate, optionally including an optically reflective surface, a conductive layer on the substrate, a photoconductive layer on the conductive layer, and an elastomer layer on the photoconductive layer. The system makes use of the properties of elastomeric imaging devices in which frost images, screened frost images, and limited spatial frequency or holographic images can be produced. A corona discharge can be used to charge, in a selective manner, a surface of the elastomer and optionally the substrate thereby creating an electrical field across the photoconductor and elastomer combination. Where the photoconductor is exposed to light, the electric field is altered resulting in a mechanical force that deforms the elastomer. Sheridon states that the system can be used for large panel displays.

U.S. Pat. No. 4,897,325 (Akkapeddi) describes a flexible mask for use in photolithography. The flexible mask is made by providing a flexible substrate such as 20–50 mil thick glass, a metallic layer on the glass, and a photoresist layer on the metallic layer, patterning the photoresist layer via known techniques, and developing the mask by selectively removing portions of the metal film resulting in a pattern of metal film on the flexible glass film. The flexible mask can be made to conform to a nonplanar structure including a layer of photoresist on a nonplanar surface, and irradiation through the mask, followed by development, can result in a pattern of photoresist on the nonplanar surface which can be followed by additional development resulting in an ultimate desired patterned, nonplanar surface.

International Pat. Publication WO 96/29629 (Whitesides, et al.) describes encapsulation of a liquid metal within a cavity of a flexible material such as an elastomer. Where the interior surface of the cavity is complementary to a diffraction grating surface, the liquid metal can define a flexible diffraction grating. The interior surface can be of another optically-interesting shape, such as a convex or concave shape, to form a liquid metal into a desired optical surface.

Liquid crystals are well-known for use in displays. In typical liquid crystal display systems, a liquid crystalline material is provided in a chamber across which an electric field can be applied. Plane-polarized light is directed at the liquid crystalline material and, when the material is made to align with the plane-polarized light, via application of an electric field, the light passes through the material. Where an electric field is not applied the liquid crystalline material does not align with the plane of the polarized light, and light passage is blocked. These and other types of liquid crystalline systems find widespread use as displays.

The above and other disclosures are representative of advancements in certain fields of optical modulation. It is an object of the invention to provide a new class of relatively inexpensive and non-complex optical modulation systems.

SUMMARY OF THE INVENTION

The present invention provides a series of methods and systems for controlling electromagnetic radiation. In one aspect the invention involves a method including arranging a fluid in a first fluid pattern and allowing electromagnetic radiation to interact with the fluid in the first fluid pattern and to emerge from the interaction in a first identifiable electromagnetic radiation pattern. The fluid is redistributed, according to the method, so as to alter the first fluid pattern to a second fluid pattern. Electromagnetic radiation is allowed to interact with the fluid in the second fluid pattern and to emerge from the interaction in a second identifiable electromagnetic radiation pattern.

In another aspect the invention involves a method of establishing a path of electromagnetic radiation in a flexible article and allowing the path of electromagnetic radiation to emanate from the flexible article in a first amount. The amount of electromagnetic radiation emanating from the flexible article is changed from the first amount to a second amount by changing the configuration of the flexible article.

The invention provides, according to another aspect, a method of controlling an identifiable electromagnetic radiation pattern. An assembly is provided that includes a fluid which is at least partially opaqued to the electromagnetic radiation and is contained in a cavity. A first identifiable pattern of electromagnetic radiation is established by arranging the fluid within the cavity in a first fluid pattern, exposing at least a portion of the assembly to electromagnetic radiation, and allowing a portion of the electromagnetic radiation to be blocked by the at least partially opaque fluid while another portion of electromagnetic radiation is allowed to pass through the assembly and to emanate from the assembly in a first pattern. The first pattern of electromagnetic radiation is identified, and then the first pattern is prevented from emanating from the assembly by altering the pattern of fluid within the cavity from the first pattern.

In another aspect the invention provides a method involving changing a first identifiable electromagnetic radiation pattern to a second identifiable electromagnetic radiation pattern by changing the physical distribution of a fluid that at least partially blocks the electromagnetic radiation positioned in a container between a first portion of a container interior surface and a second portion of the container interior surface by moving the first portion of the container interior surface relative to the second portion of the container interior surface.

The invention also provides a method involving providing a flexible assembly, at least a portion of which is defined by an at least partially opaque fluid. Electromagnetic radiation is passed through a portion of the assembly and the amount of electromagnetic radiation passing through the portion of the assembly is adjusted by alternately increasing and reducing the amount of the at least partially opaque fluid resident in the portion.

Also provided is a method that involves providing a flexible assembly, at least a portion of which is defined by a fluid. Electromagnetic radiation is introduced into a portion of the assembly and allowed to interact with the fluid. Electromagnetic radiation is allowed to emanate from the portion of the assembly, and the amount of electromagnetic radiation emanating from the portion of the assembly is adjusted by alternately increasing and reducing the amount of the fluid resident in the portion.

Also provided is a method involving providing a flexible article having at least one contoured surface including a plurality of indentations and protrusions. The contoured surface is positioned adjacent a second surface of a second article such that the protrusions contact the second surface. Electromagnetic radiation is passed through the contoured surface, and the amount of electromagnetic radiation passing through the contoured surface is adjusted by alternately urging the contoured surface against the second surface and releasing the contoured surface from the second surface.

Also provided is a method involving establishing a path of electromagnetic radiation in an elastomeric article and allowing the path of electromagnetic radiation to emanate from the elastomeric article in a first amount and to be detected. The method involves at least in part blocking the path of electromagnetic radiation thereby reducing the electromagnetic radiation emanating from the elastomeric article from the first amount to a second amount.

Also provided is a method involving reflecting a first amount of electromagnetic radiation from an internal surface of a flexible article, and altering the first amount of electromagnetic radiation to a second amount by changing the configuration of the flexible article.

In another aspect, the invention involves a method of making an electromagnetic radiation modulator. The method involves providing an isotropically-etched surface defining an etched pattern, hardening a fluid precursor at the isotropically-etched surface thereby forming an article having a pattern of protrusions, corresponding to the etched pattern, and complementary indentations. The article is arranged in a system including a fluid, selected to interact with electromagnetic radiation in indentations in the article. The article can be arranged in the system by positioning the source of the electromagnetic radiation directed at the fluid.

According to another aspect the invention provides a series of systems. One system involves an at least partially opaque fluid in a container constructed and arranged to be exposed to electromagnetic radiation and to alter passage through the container of the electromagnetic radiation. Also included is a modulator associated with the container and constructed and arranged to alter physical distribution of the fluid in the container. The at least partially opaque fluid in the container can be constructed and arranged to be exposed to the electromagnetic radiation by being positioned in the path of electromagnetic radiation emitted by a source of radiation.

In another aspect the invention provides a system including a flexible article constructed and arranged to be exposed to electromagnetic radiation, for example, by being positioned in a path of a radiation source, and to at least partially reflect the electromagnetic radiation from the surface of the article. A modulator is provided that is associated with the article and constructed and arranged to alter the conformation of the surface of the article.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure.

BRIEF DESCRIPTION OF THE DRAWINGS

FIG. 3 illustrates schematically a light valve of the invention deformed so as to make light pass through selected regions, for use as a display or the like;

FIG. 7 is a photocopy of an SEM image of a mold 60 (retroreflective tape) of FIG. 2a;

DETAILED DESCRIPTION OF THE INVENTION

The present invention provides electromagnetic radiation valves defined by systems that include at least one flexible member, modulation of the conformation of which alters the passage of electromagnetic radiation through the system. The systems can define components of display devices, sensors, and the like.

Referring to FIGS. 1a–1g, one embodiment of an electromagnetic radiation valve in accordance with the invention is illustrated schematically, along with one technique for fabrication of electromagnetic radiation valves. Use of the system will be described first with reference to FIGS. 1a and 1b. The system includes a member 20, which is essentially transparent to electromagnetic radiation of interest. Member 20 includes a contoured surface 22 including a plurality of indentations 24 and intervening protrusions 26. Article 20 is positioned such that protrusions 26 meet a surface 28 of an article 30 that also is essentially transparent to the electromagnetic radiation of interest. As illustrated, article 30, and surface 28 thereof, is essentially planar and the outermost portions of protrusions 26 of article 20 define essentially a plane that meets the plane of surface 28. This is provided for purposes of illustration only, as a nonplanar configuration also can be provided.

Figure 1A:
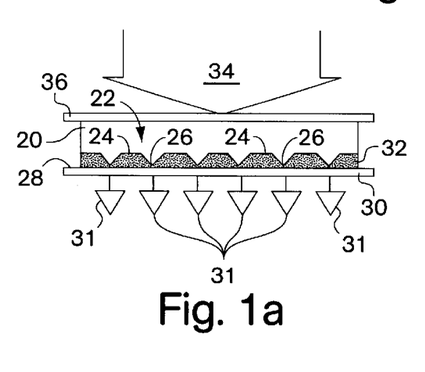
FIGS. 1a–g illustrate schematically an elastomeric light valve in accordance with the invention, its use, and one technique for its fabrication.

Indentations 24 of article 20 contain a fluid that, according to one set of embodiments, is at least partially opaque to the electromagnetic radiation of interest. Since article 20 is essentially transparent to the electromagnetic radiation, and fluid 32 is essentially opaque, electromagnetic radiation 34 directed at article 20 passes through article 20 and through article 30 only at locations where protrusions 26 contact surface 28 of article 30 and displace opaque fluid 32, since protrusions 26 facilitate the establishment of a pattern of fluid 32 including regions of fluid 32 and intervening regions free of the fluid. In the arrangement of FIG. 1a, electromagnetic radiation 34 interacts with the fluid 32 and emerges from this interaction (emerges from the side of article 3) in a very small amount represented schematically by the emergence of pixels 31 of weak electromagnetic radiation.

The system illustrated in FIG. 1a can be considered a container or cavity containing fluid 32, the container defined by surface 28 of article 30 and surface 22 of article 20, surface 28 and surface 22 defining container interior surfaces. Fluid 32 can be introduced into the region defined between indentations 24 of article 22 and surface 28 of article 30 via capillary action, or can be provided on either article 20 or article 30 and then the other article provided against the article upon which the fluid is first provided. Although not illustrated, the container interior surface can be further defined by side container walls provided to further contain fluid 32, although where the surface-to-volume ratio of the container is high, capillary forces will maintain fluid 32 within the container without side container walls.

Figure 1B:
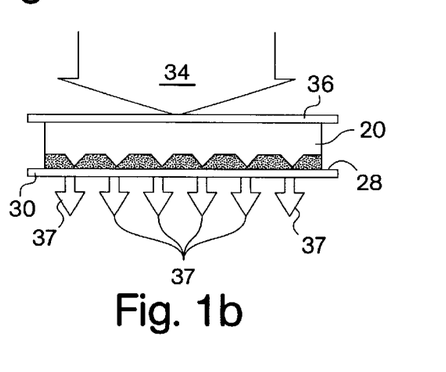

The system of FIG. 1a allows for the Establishment of a path of electromagnetic radiation in article 20, where electromagnetic radiation 34 impinges upon article 20, and the path of electromagnetic radiation is allowed to emanate from the elastomeric article in a first amount, which is a small or negligible amount as represented schematically by pixels 31. The amount of electromagnetic radiation emanating from the flexible article can be changed to a second amount by changing the configuration of article 20 as illustrated in FIG. 1b. Specifically, the configuration of contoured surface 22 can be changed by urging contoured surface 22 against surface 28 of article 30, thereby flattening the outermost surfaces of protrusions 26. Protrusions 26 decrease in cross-sectional area in a direction away from article 20. Therefore, as protrusions 26 are urged against surface 28 of article 30, a greater cross-sectional area of protrusions 26 contact surface 28 thus fluid 32 is displaced from a greater portion of surface 28 and its amount resident between surface 28 and surface 22 is reduced, and the amount of electromagnetic radiation emanating from flexible article 20 increases, as illustrated by pixels 37 of relatively strong emanating electromagnetic radiation. When fluid 32 is displaced from the indentations of contoured surface 22 it can move out of the region between surface 22 and surface 28 and form a small pool at the exterior boundary of the interface between these surfaces and remain held at that boundary by capillary forces or, where a side container wall is provided that is flexible, the side container wall can be made to expand to contain excess fluid displaced from the area between the two surfaces. Alternatively, a fluid conduit can connect the region between the two surfaces and a fluid reservoir to allow ingress and egress of fluid 32 from between surfaces 22 and 28.

In the embodiment illustrated, article 20 is essentially planar, overall, and is provided between essentially planar and rigid transparent plates 30 and 36. Fluid 32 can be displaced from between surfaces 28 and 22 by mechanically urging plates 30 and 36 toward each other which changes the configuration of flexible protrusions 26, in turn reducing the volume of indentations 24 and displacing fluid 32 from between the two surfaces. Alternatively, fluid 32 can be withdrawn from between surfaces 28 and surface 22 via sealed fluid connection to a source of reduced pressure. That is, fluid 32 can be withdrawn, via a vacuum, from between surfaces 22 and 28 whereby atmospheric pressure, or other condition of surrounding pressure greater than the vacuum, will urge surface 28 against 22 and compress protrusions 26 as illustrated. Transparent member 36 may not be needed in this and other embodiments.

The system of FIGS. 1a and 1b can be defined as a flexible assembly that includes, in combination, article 20 (which can be flexible overall or includes at least flexible protrusions 26) and fluid 32. The assembly can be exposed to electromagnetic radiation 34, and the amount of electromagnetic radiation that is allowed to pass through the assembly can alternately be increased and reduced by alternately increasing and reducing the amount of fluid resident in the portion between surface 22 and surface 28. Where the amount of fluid between surfaces 28 and 22 is controlled via external control of pressure applied to 32, this can be accomplished by alternately increasing and reducing the pressure of fluid 32 between surfaces 28 and 22. Where the pressure of fluid 32 increases, the volume of indentations 24 will increase and the passage of electromagnetic radiation will be reduced or blocked completely. Where pressure applied to fluid 32 is reduced, surface 22 will be urged against surface 28 protrusions 26 will increase in cross-sectional contact with surface 28 fluid 32 will exist over a relatively smaller portion of surface 28 and the passage of electromagnetic radiation 34 through the system will increase.

In a preferred embodiment protrusions 26 are elastomeric, and the entire article 20 can be elastomeric according to particularly preferred embodiments. "Elastomeric" in this context defines a material that exhibits a restoring force in response to a deformation. That is, a material that deforms under an applied load and, because of volume and surface forces, tends to return to the form it had prior to application of the load. In this embodiment, article 36 can be urged in the direction of article 30 causing protrusions 26 to deform and to displace article 32, increasing the passage of electromagnetic radiation 34, and when the load is released protrusions 26 are restored to their fully extended conformation illustrated in FIG. 1a, drawing fluid 32 into the region defined between surfaces 22 and 28 and reducing or blocking the passage of electromagnetic radiation 34. In this way the amount of electromagnetic radiation passing through the contoured surface 22, and through the entire flexible assembly, is adjusted by alternately urging the contoured surface against surface 28 and releasing the contoured surface from surface 28.

Figure 1C:
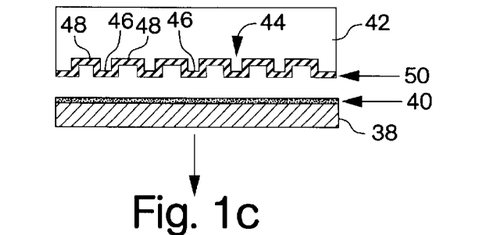
Figure 1D:
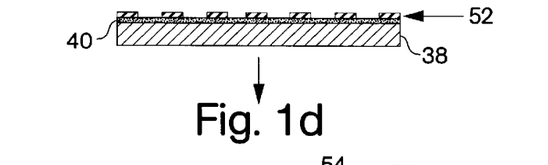
Figure 1E:
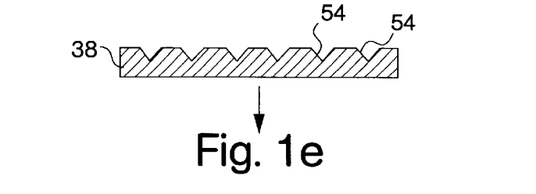
Figure 1F:
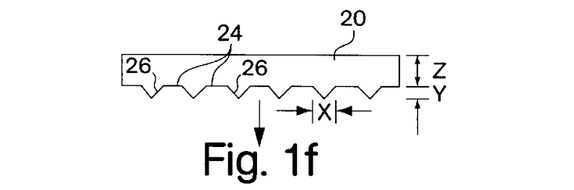

One technique for fabrication of article 20 will now be described. The technique is known for fabrication of other articles, as described in International Pat. Publication WO 96/29629, and in co-pending, commonly-owned U.S. patent application Ser. No. 08/681,003, filed Jul. 22, 1996 (which is now abandoned) and entitled "Wave-Front Engineering Using Elastomeric Optical Elements", by Rogers, et al. both incorporated herein by reference. Referring to FIG. 1c, a silicon substrate 38 is coated with a thin layer 40 of a resist material such as silver. Microcontact printing, as described in U.S. Pat. No. 5,512,131 (Kumar, et al.), incorporated herein by reference, is used to apply, via a patterned stamp 42 having a contoured surface 44 including a plurality of protrusions 46 and indentations 48, a self-assembled monolayer-forming species 50 to the top surface of thin film 40 in a pattern corresponding to the pattern of protrusions 46. This is illustrated in FIG. 1d in which a self-assembled monolayer 52, in a pattern corresponding to the pattern of protrusions 46 of article 42, is provided upon thin film of resist 40. The article then is exposed to an etchant that removes thin film 40, but to which self-assembled monolayer 52 is resistant, resulting in removal of thin film 40 at areas not protected by self-assembled monolayer 52. Subsequently, the system is exposed to an etchant that etches the silicon article 38, but which is resisted by thin film 40 (remaining at portions originally covered by self-assembled monolayer 52), and article 38 is anisotropically etched at uncovered portions, as illustrated in FIG. 1e. An elastomeric article 20 then can be cast upon the anisotropically-etched, contoured surface of silicon article 38 from a fluid prepolymeric solution, resulting in article 20 as illustrated in FIG. 1f having protrusions 26 that correspond to the etched indentations in silicon substrate 38.

By carefully controlling the size and spacing of indentations 54 in silicon substrate 38 (by, in turn, carefully controlling the placement of self-assembled monolayer pattern 52 on thin film resist 40), any of a wide variety of sizes, depths, and spacings of protrusions 26 in article 20 can be provided. For example, depending upon the plane of silicon etched, protrusions 26 can be made to be square pyramidal or triangular pyramidal. Additionally, control of the pattern of self-assembled monolayer 52 can result in a pattern of indentations 54 in article 38, and resulting protrusions 26 of article 20, that results in an interconnected pattern of indentations 24 in article 20. Where indentations 24 are interconnected, ingress and egress of fluid 32 into and out of the region between contoured surface 22 and surface 28 of article 30, is facilitated.

The size of indentations 24 and protrusions 26 can be controlled to be essentially indistinguishable by the human eye, where desired. That is, the pattern of protrusions 26 and indentations 24 of contoured surface 22 can be made fine enough such that, when a pattern of electromagnetic radiation 34 emanating from article 20 as illustrated in FIGS. 1a and 1b is viewed by the human eye, individual pixels 37 of electromagnetic radiation emanating from article 20 are not individually distinguishable by the viewer, but appear simply as an overall amount of electromagnetic radiation that becomes brighter as protrusions 26 are deformed against surface 28 and weaker as protrusions 26 recover to their fully-extended configuration of FIG. 1a.

Since, in most cases, it is desirable that individual pixels of electromagnetic radiation not be individually identifiable by the human eye, except perhaps at very close range, in this set of embodiments dimension x, the maximum lateral dimension of protrusion 26 and, in the embodiments illustrated, the maximum lateral dimension of indentation 24, is less than about 0.5 mm, preferably less than about 250 microns, more preferably less than about 100 microns. It has been found that the height of protrusions 26 (dimension y of FIG. 1f) is advantageously slightly over half dimension x. The thickness of article 20 (dimension z) can be any of a wide variety of dimensions and, for stability, it is preferred that dimension z be at least about ten times dimension x, more preferably at least about 50 times dimension x.

Figure 1G:
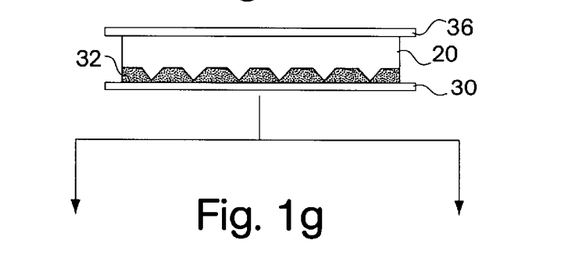

As mentioned above, to complete the arrangement including contoured surface 22 adjacent surface 28 of article 30 and at least partially opaque fluid 32 contained between the surfaces, as illustrated in FIG. 1g, article 20 can be placed adjacent surface 28 and fluid 32 can fill the space between surface 28 and surface 22 by capillary action, or fluid 32 can be placed on surface 28 and article 20 placed against surface 28.

Figure 2A:
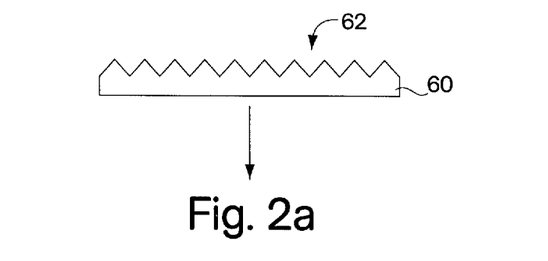
FIGS. 2a–g illustrate schematically a light valve according to another embodiment of the invention, its use, and one technique for its fabrication.

A second type of electromagnetic radiation valve in accordance with the invention is illustrated schematically in FIGS. 2a–g, and involves reflecting electromagnetic radiation from a surface of a flexible article and altering the amount of electromagnetic radiation by changing the configuration of the flexible article, in particular a surface of the flexible article. A method that can be used to fabricate such an article is described first. Referring to FIG. 2a, an original substrate 60 including a corner cube array contoured surface 62 is provided in accordance with an exemplary, illustrative embodiment. The original surface 60 can be defined by retroreflective tape, or the like. A flexible article that defines one portion of an electromagnetic radiation valve in accordance with this aspect of the invention can be cast directly from substrate 60, or a first master 64 (FIG. 2b) can first be cast from surface 62 and then article 66 can be cast from master 64. Article 66 includes a contoured surface 68 having dimensions that can be on the order generally of dimensions of contoured surface 22 of FIG. 20. Typically, the periodicity of protrusions 70 and indentations 72 of contoured surface 68 (dimension x) will be less than about 1 mm, preferably less than about 0.5 mm, more preferably about 100 microns. The height y of the protrusions is on the same order, preferably slightly less. The thickness z of article 66, for stability, preferably will be at least ten times dimension x, more preferably at least about twenty times dimension x.

Figure 2B:
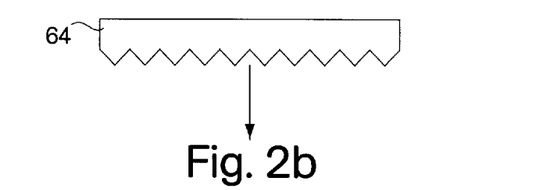
Figure 2C:
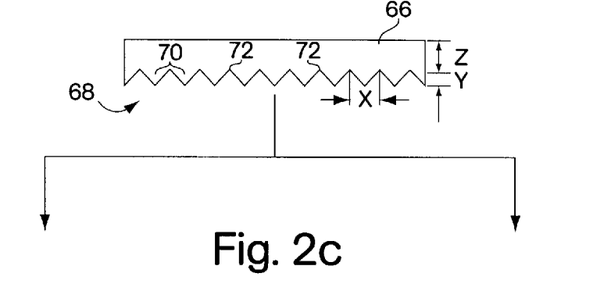
Figure 2D:
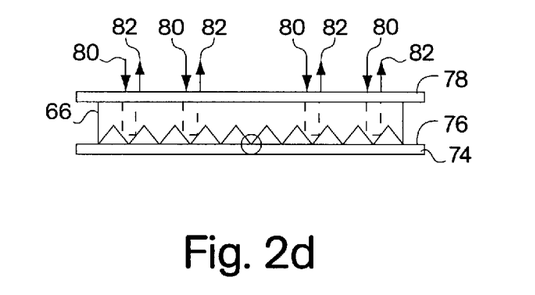
Figure 2E:
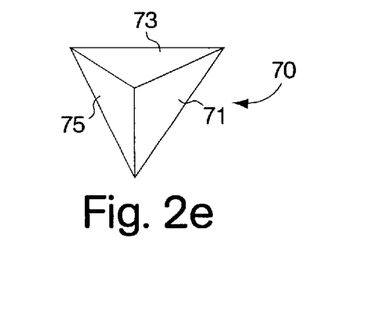
Figure 2F:
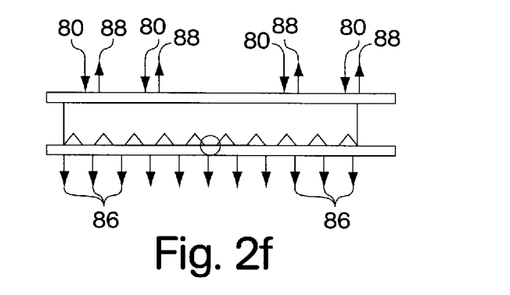

Referring to FIG. 2d, an assembly is provided including article 74 having a surface 76 positioned adjacent the outermost surfaces of protrusions 70 of article 66, and article 78 on the side of article 66 opposite that of article 74. Preferably, all of articles 74, 78, and 66 are essentially transparent to electromagnetic radiation of interest in this embodiment. FIG. 2e is a blown-up, face-on view of a protrusion 70 of article 66. Protrusion 70, cast from a corner cube array substrate (or a master that had been cast from a corner cube array substrate) includes three faces 71,73 and 75 arranged relative to each other in a manner such that electromagnetic radiation 80, incident internally upon each face of the corner cube, is totally internally reflected and emerges as electromagnetic radiation 82 in the direction from which the electromagnetic radiation 80 was incident. Where contoured surface 68 of article 66 is urged against surface 76 of article 74, for example via urging article 74 against article 78 or applying a vacuum to the region intervening surface 68 and surface 76, corner cube array protrusions 70, which are flexible, are deformed against surface 76 such that each defines a surface 84 that is essentially normal to the direction of incident radiation 80, and thus passes radiation (represented schematically by electromagnetic radiation pixels 86). A lesser amount 88 of electromagnetic radiation is totally internally reflected from corner protrusions 70 and re-emerges from the direction of incident radiation of 80.

Figure 3:
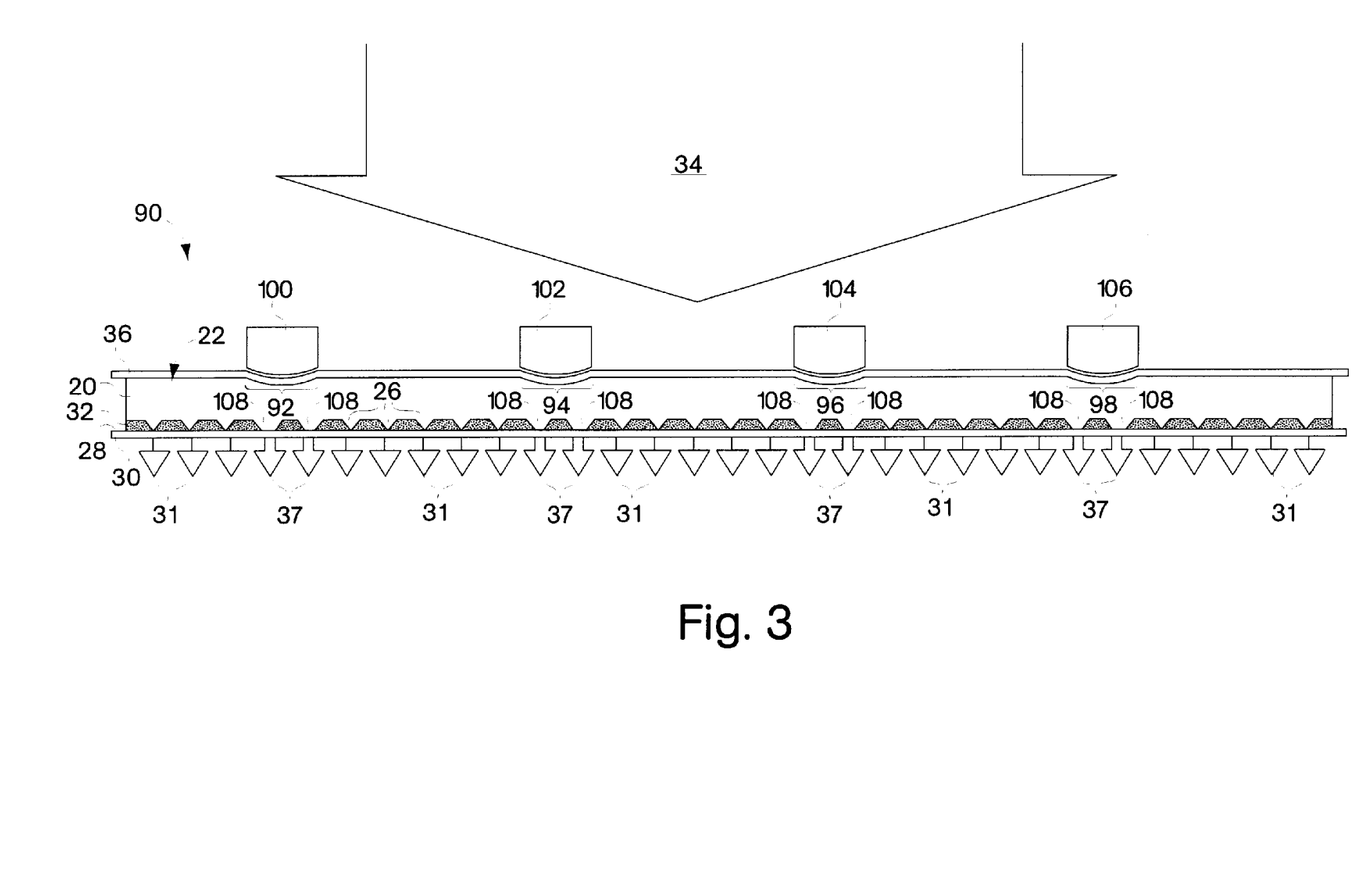

Referring now to FIG. 3, one embodiment of a display device that makes use of the arrangement illustrated in FIGS. 1a and b is illustrated schematically. A system 90 includes article 20 provided between transparent plates 30 and 36, with at least partially opaque fluid 32 contained between contoured surface 22 of article 20 and surface 28 of article 30. Electromagnetic radiation 34, incident upon plate 36, is almost completely blocked by fluid 32 at most locations along surface 28 of plate 30 as represented by the emergence of pixels 31 of weak electromagnetic radiation. An identifiable pattern of electromagnetic radiation emerging from plate 30 is created by selective application, at regions 92, 94, 96, and 98 of plate 36, of a fluid-deflecting force by components 100, 102, 104 and 106, respectively, of a modulator arrangement (not fully illustrated). In this embodiment, plate 36 is flexible to the extent allowing deformation through the plate, via one of the modulator components, of protrusions 108 of article 20, while the remaining protrusions are relatively undisturbed. Alternatively, the system can be used without plate 36, with modulator components 100–106 impinging directly upon article 20. The results of the modulation, as illustrated, is that a first identifiable electromagnetic radiation pattern defined by pixels 37 of relatively stronger light emerge from plate 30 in alignment with regions 92, 94, 96, and 98 of article 20 that are stressed by modulator components 100–106. The modulator components are essentially transparent to the electromagnetic radiation 34, as illustrated. System 90 can produce an identifiable electromagnetic radiation pattern that is defined by a display of information codified in the arrangement of regions 92–98. As one example, regions 92–98 can define a written symbol or symbols, or other visible display, or a plurality of pixels in an optical information system such as an optical computer, or the like. For example, regions 92–98 each can be addressed by an individual laser beam or can otherwise serve as gates in an optical information system. When force applied by one or more modulator components 100–106 is changed (for example removed) fluid 32 is redistributed so as to alter the first fluid pattern to a second fluid pattern. Electromagnetic radiation 34 then interacts with fluid 32 in a different way and emerges from the interaction in a second identifiable electromagnetic radiation pattern. For example, where modulators 100 and 102 exert greater force on article 22 and modulators 104 and 106 are removed, increased intensity electromagnetic radiation signals emanate at regions 92 and 94, and electromagnetic radiation is prevented from emanation at regions 96 and 98. The various electromagnetic radiation patterns can be identified visually, by photosensitive devices, or the like.

Figure 2G:
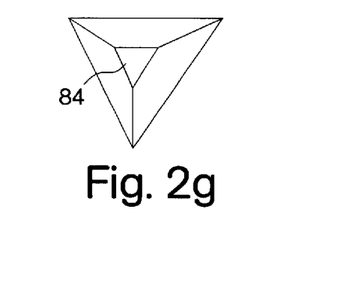

A system similar to that of FIG. 3 can be constructed using an internally reflective article 66, as illustrated in FIG. 2e and 2g.

One area in which arrangements such as those of FIGS. 1–3 can be used are in the case of variable-passage windows, that is, windows that can be made to block or pass light, controllably, across an essentially complete spectrum of intensity. In one arrangement, system 90 could define a window or a light valve portion of a multi-component window where, rather than individual modulator components 100–106, the entire structure is maintained with protrusions in an undeformed state (uncompressed against surface 28) or all of protrusions 26 are deformed to a uniform degree against surface 28 allowing uniform passage of light through the window. Control of the amount of deformation of protrusions 26, hence the proportion of surface 28 covered by fluid 32, can be controlled by a modulator that redistributes the fluid by physically urging plate 36 against plate 30 via electro-mechanical or magnetic force or the like, or the pressure of fluid 32 resident between article 20 and plate 30 can be reduced, and atmospheric pressure thereby used to compress article 20 against surface 28 of plate 30, displacing fluid 32 from the intervening region. In this way the ratio of the fluid, to intervening regions free of the fluid, is altered to either block or pass more or less electromagnetic radiation. In this arrangement, it can be most convenient to provide elastomeric protrusions 26 so that compression of protrusions 26 against surface 28 can be reversed simply by releasing the pressure applied to article 20 in the direction of surface 28 (or releasing the vacuum applied to fluid 32).

Described above are embodiments in which, where fluid 32 is used, fluid 32 is at least partially opaque to electromagnetic radiation 34. In these embodiments, the fluid can be completely opaque to electromagnetic radiation 34. That is, fluid 32 can be essentially entirely reflective, as a liquid metal such as mercury, or essentially completely absorptive of the electromagnetic radiation, such as a fluid containing a high concentration of a dye or dyes that are essentially completely absorptive of electromagnetic radiation 34. Alternatively, the fluid can be slightly, but not completely absorptive, and this can be useful where it is desirable to partially block, but not completely block, electromagnetic radiation 34 when protrusions 26 are in their completely extended and undeformed configuration. This may be the case where system 80 defines a controlled-passage window where, in the unstressed configuration the window provides, for example, 50 percent absorption of sunlight and can be maximally stressed to pass nearly 100 percent of the sunlight. Where sunlight is desirably blocked it often will be advantageous to include, in fluid 32, an absorber of ultra-violet magnetic radiation, including "UVA" and "UVB", as well as an absorber of visible magnetic radiation. For thermal control, an infrared absorber can also be included. In these arrangements, it can be advantageous to include a relatively high concentration of a relatively strong absorber of UV and IR radiation in fluid 32, with a lesser concentration of a visible electromagnetic radiation absorber, to partially block visible electromagnetic radiation but fully block UV and/or IR electromagnetic radiation. Of course, where it is desirable to completely block one type and variably block another type of radiation, a complete blocker of the first type of electromagnetic radiation can be provided in any of plates 30, 36, or article 20 and the blocker of electromagnetic radiation that is desirably variably blocked provided in fluid 32

Another set of embodiments will be described, with reference to FIG. 3, involving introducing electromagnetic radiation 34 into flexible assembly 90, or into at least a portion of the flexible assembly, and allowing the introduced electromagnetic radiation to interact with fluid 32 while allowing different electromagnetic radiation to emanate from the assembly. This can be accomplished where fluid 32 contains a fluorescent or phosphorescent agent and can be made to fluoresce or phosphoresce via the application of incident radiation 34. In this arrangement the emission, or emanation, of electromagnetic radiation from article 90 will be approximately proportional to amount of fluid 32 contained between surface 22 of article 20 and surface 28 of article 30. That is, when protrusions 26 are in their fully extended, unstressed conformation, and a maximum of fluid 32 is contained between surface 22 and surface 28 application of electromagnetic radiation 34 will result in a maximum of emanation of electromagnetic radiation from fluorescence or phosphorescence of fluid 32. With increased application of a force deforming protrusions 26 against surface 28 and displacing fluid 32 from its container defined between surface 22 and surface 28 emanation of the second, fluorescent or phosphorescent electromagnetic radiation will decrease while passage of incident electromagnetic radiation 34 will increase. That is, a first identifiable electromagnetic radiation pattern will be changed to a second identifiable electromagnetic radiation pattern. The system can be arranged to allow emanation of fluorescent or phosphorescent radiation from fluid 32, without passage of incident radiation 34, by constructing article 30 to be opaque to incident radiation 34.

Where the devices of the invention, described above, are included in an optical modulator for use in an optical computer, for example, a variety of electromagnetic radiation sources can be used, and sources of electromagnetic radiation can be matched with fluid 32 containing one or more dyes, pigments, a fluorescent or phosphorescent additives. Desired matching sources of electromagnetic radiation with suitable dyes, pigments, or fluorescent or phosphorescent compounds can be selected readily by those of ordinary skill in the art using, as a base fluid, an aqueous or organic fluid in which the selected dye, pigment, or fluorescent or phosphorescent compound is soluble or can be carried. For purposes of example only, without the intention of limiting the invention, the following dye or pigment materials and lasers that produce electromagnetic radiation corresponding to absorption characteristics of those dyes or pigments, follows:

| Wavelength (nm)/laser | | Dye/Maximum Absorption |
|---|---|---|
| 457 | Argon Ion | Acramine Yellow (420 nm) |
| 488 | Argon Ion | Acridine Orange (489 nm), Fluorescein (491 nm) |
| 514 | Argon Ion | Eosin Y (514 nm) |
| 676 | Argon/Krypton | Methylene Blue (661 nm) |
| 647 | Krypton | Jenner stain (651 nm), |
| 676 | | Methylene Blue (661 nm) |
| 694 | Ruby | Prussian blue (694 nm), |
| 780 | Semiconductor | Copper Phthalocyanine |
| 780 | | (795 nm in sulfuric acid), |
| 810 | | Indocyanine Green (775 nm) |
| 820 | | |
| 830 | | |
| 850 | | |
| 870 | | |
| 532 | Neodymium:YAG (frequency X2) | Ethyl Eosin (532 nm in ethanol); Erythrosin B (525 nm); Eosin Y (514 nm) |
| 355 | Neodymium:YAG (frequency X3) | Acridine (358 nm) |
| 266 | Neodymium:YAG (frequency X4) | Prussian blue (260 nm), |
| All | | Carbon black |

Articles 20 and 66 can be fabricated from known material essentially transparent to the electromagnetic radiation of interest, and including flexible protrusions 26, preferably elastomeric protrusions 26. As mentioned, it is often most convenient to fabricate the entire article of elastomeric material. A wide variety of elastomeric materials can be used, for example natural rubbers and synthetic polymers having rubber-like characteristics, for example material such as styrene-butadiene, polybutadiene, neoprene, polyisoprene, nitrile and ethylene propylene rubbers. Also, water-based gelatin gels and dimethylpolysiloxane-based silicon gels. Suitable elastomers also are disclose in U.S. Pat. No. 5,512,131, incorporated herein by reference, including silicone polymers, epoxy polymers, and acrylate polymers. Of course, where an arrangement as illustrated in FIGS. 2e and 2g is used, the difference in refractive index between the material defining protrusions 70 and the surrounding environment must be sufficient to allow sufficient internal reflection, as illustrated. Selection of materials that meet these parameters are within the level of one skilled in the art.

Very good resolution is achieved in accordance with the valves of the present invention. The resolution of the devices of the invention is less than 1 mm, preferably less than 0.5 mm, more preferably less than about 100 microns according to one set of embodiments. In a set of preferred embodiments in which the resolution of protrusions of the light valves of the invention is smaller, the pixel size of the electromagnetic radiation valves of the invention is significantly reduced to less than about 60 microns. This can be achieved using techniques as described by Wilbur, et al., *Chem. Mater.*, 8, 1380 (1996); Neudeck, et al., *Applied Optics*, 35, 3466 (1996).

Described above are light valves that are used to control the passage of electromagnetic radiation for purposes of display, information transmittal, storage, or retrieval, or the like. The light valves of the invention also can be used as sensors, for example, displacement sensors (pressure sensors, acceleration sensors, etc.). For example, the valves of the invention can be addressed by modulators that are connected to a source of detectable motion (a source of pressure, vacuum, or the like) and, when electromagnetic radiation is directed at the valve and emanating electromagnetic radiation detected, a change in force applied to the valve by the modulator resulting from the change in sensed pressure, acceleration, etc. is detected and can be quantitatively determined by detection/quantitative determination of emanating electromagnetic radiation.

The function and advantage of these and other embodiments of the present invention will be more fully understood from the examples below. The following examples are intended to illustrate the benefits of the present invention, but do not exemplify the full scope of the invention.

EXAMPLE 1

Fabrication and Use of Electromagnetic Radiation Valve Including an Opaque Fluid An electromagnetic radiation valve was fabricated in accordance with the procedure outlined schematically in FIG. 1. A silicon master 38 having an array of square pyramidal cavities 54 in its surface was fabricated using a known procedure—a combination of microcontact printing of hexadecanethiol on silver, selective removal of underivatized silver in an aqueous ferricyanide solution, and anisotropic etching of Si(100) in an aqueous solution of KOH/2-propanol (Peterson, *Proc. IEEE.*, 70, 420 (1982); Kendall, *Ann. Rev. Mater. Sci.*, 9, 373 (1979); Xia et al., *J. Electrochem. Soc.*, 1423, 1070 (1996); International Pat. Publication WO/96/29629).

A liquid prepolymer of polydimethyl siloxane (PDMS) was poured over the surface of the silicon master 38, cured to a solid material, and removed by peeling it away from the master. This PDMS block then was sandwiched between two glass plates 30 and 36, the void region between contoured surface 22 of the PDMS block 20 and surface 28 of plate 30 was filled with an opaque dye solution (crystal violet in trimethylene glycol) by capillary filling (Kim, et al., *Nature*, 376, 581 (1995); Dong, et al., *J. Colloid Interface Sci.*, 172, 278 (1995)). Vertical pressure was applied to the two glass plates 30 and 36, in the direction of each other, to compress article 20. Without compression, light passed only through the tips of the pyramidal protrusions 26 of article 20; it was completely blocked by the dye solution over the remainder of the area of surface 28.

Figure 4:
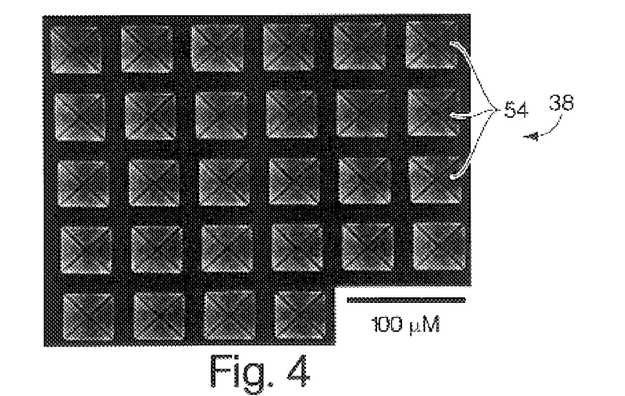
FIG. 4 is a photocopy of a scanning electron micrograph (SEM) image of a silicon master 38 of FIG. 1e.
Figure 5:
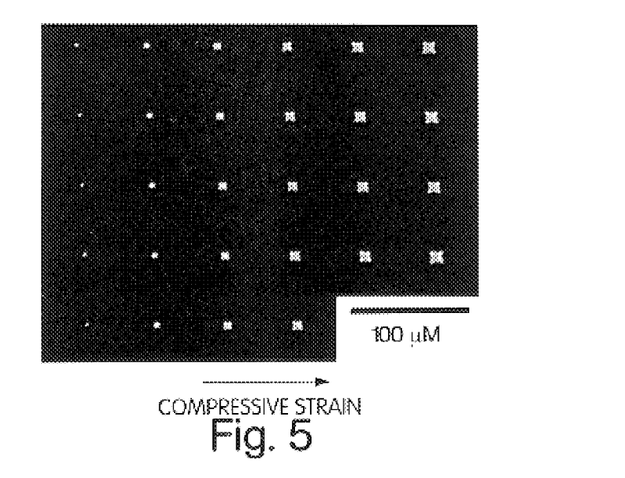
FIG. 5 is a photocopy of an optical micrograph of the electromagnetic radiation valve illustrated in FIGS. 1a and 1b.

FIG. 4 is a photocopy of a scanning electron micrograph (SEM) image of the silicon master 38 including an array of square pyramidal cavities (indentations 54) in its surface. FIG. 5 is a photocopy of an optical micrograph (in transmission mode) of the type of electromagnetic radiation valve illustrated in FIGS. 1a and 1b. PDMS block 20 was compressed unevenly across the surface, the pressure increasing continuously from left to right, thus protrusions 26 were more completely deformed against surface 28 from left to right, allowing increased passage of electromagnetic radiation from left to right as more of the opaque fluid 32 was displaced and more surface area was defined by contact between a surface of protrusion 26 and surface 28.

Figure 6:
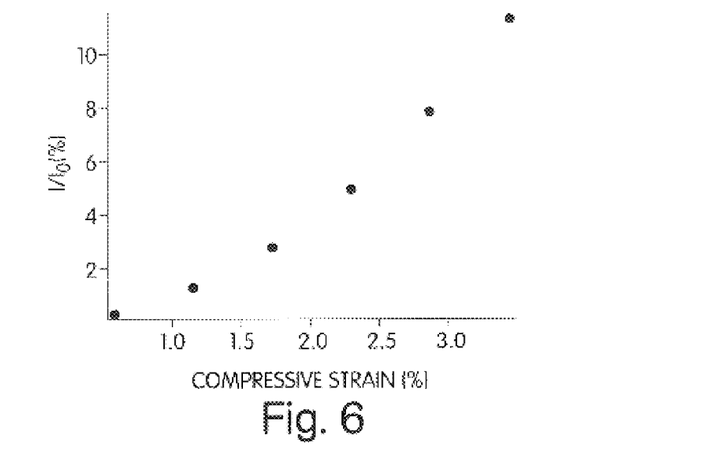
FIG. 6 is a graph showing the relationship between intensity of transmitted light and compressive strain of a light valve of FIGS. 1a and b.

FIG. 6 is a graph showing the relationship of the intensity of transmitted light (defined by pixels emanating from surface 30 in alignment with protrusions 26) to the compressive strain. The light valve was reversible. Dye solution squeezed out during compression returned on release.

EXAMPLE 2

Fabrication and Use of Internally-Reflective Light Valve

An internally-reflective light valve was fabricated by casting as illustrated in FIGS. 2a–2c. An epoxy replica 64 was prepared by casting against the relief surface of a retroreflective tape 60 (Jogslite, Silver Lake, NH), having an array of triangular corner cubes. The epoxy replica 64 was used as a master to prepare a PDMS replica 66 (FIG. 2c). PDMS block 66 was sandwiched between two glass plates 74 and 78. Since the three reflecting faces 71, 73, and 75 of the corner cube are arranged at right angles to each other (Chipman, et al., *Applied Optics*, 27, 3202 (1988)), diffuse visible light 80 incident upon the front surface of plate 78 entered article 66 and was reflected at contoured surface 68, internally of article 66, and emerged as radiation 82 in the direction from which the radiation was incident. Light could be caused to pass through article 66 and through plate 74, rather than being completely internally reflected, by deforming protrusion 70 by applying a force between plates 74 and 78 in the direction of each other. This resulted in pixels 86 of electromagnetic radiation emanating from flat surfaces 84 defined in deformed protrusions 70.

Figure 7:
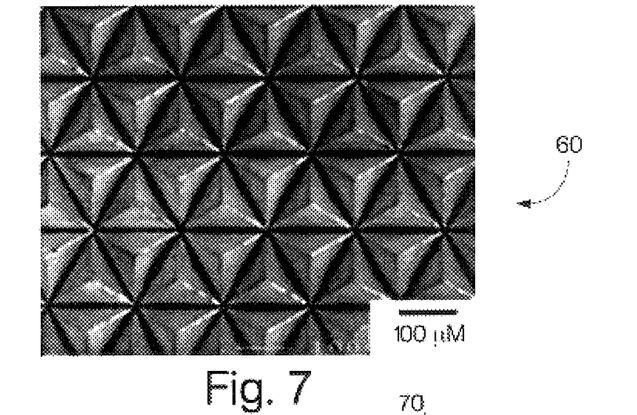
Figure 8:
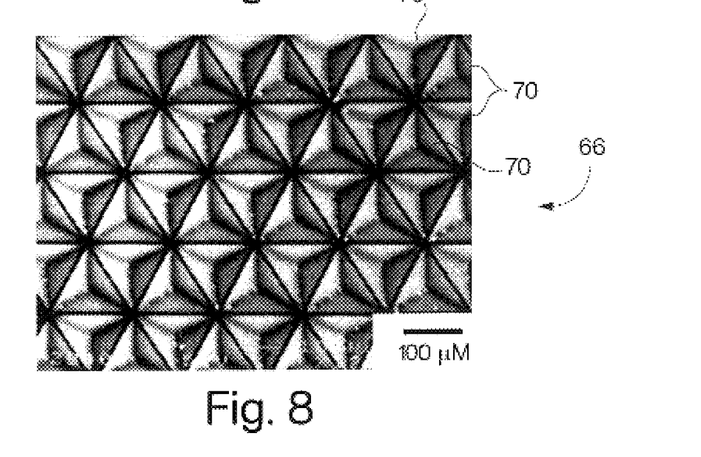
FIG. 8 is a photocopy of an SEM image of a polydimethyl siloxane (PDMS) replica 66 of FIG. 2c.
Figure 9:
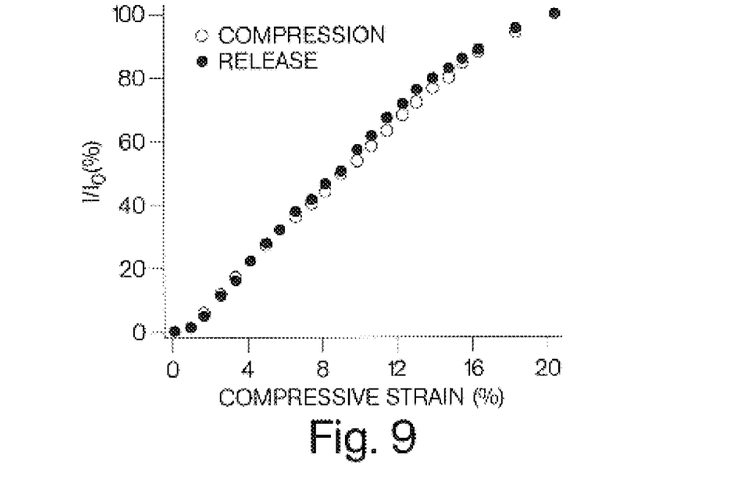
FIG. 9 is a graph of measured intensity of transmitted light versus compressive strain between plates 78 and 74 of FIGS. 2d and 2f.

FIG. 7 is a photocopy of an SEM image of retroreflective tape 60, showing corner-cube-shaped microstructures on its surface. FIG. 8 is a photocopy of an SEM image of PDMS replica 66, showing the replicated corner-cube structure of protrusions 70. FIG. 9 is a graph showing the measured intensity of transmitted light (HeNe laser, wavelength=632 nanometers) as a function of compressive strain between plates 78 and 74. The light valve was reversible. The measurements indicated that the intensity of transmitted light changed by about 25 dB over a range of compressive strain from 0 to about 20 percent.

Figure 10:
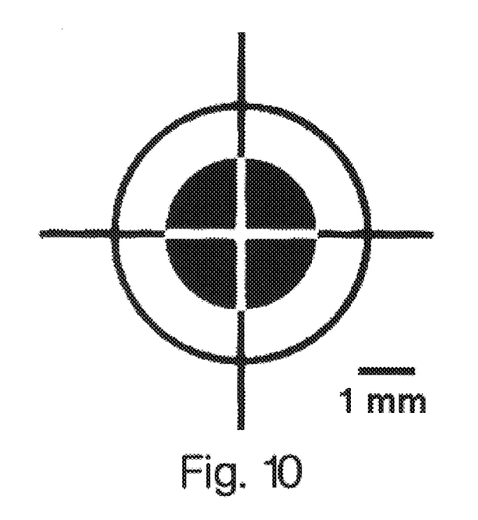
FIG. 10 is a photocopy of an optical micrograph of a test pattern used for demonstration of a light valve of the invention.
Figure 11:
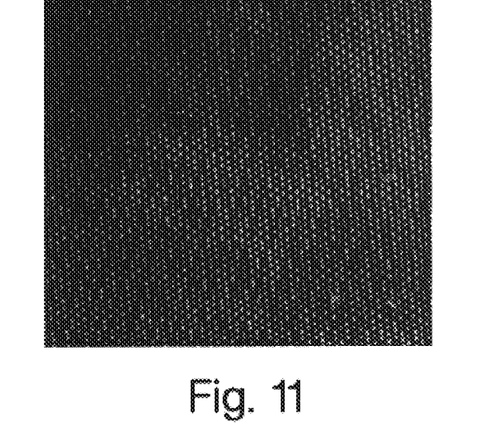
FIG. 11 is an optical micrograph of the pattern of FIG. 10 covered by an unstressed light valve 66 of FIGS. 2a–g and 8.
Figures 12, 13:
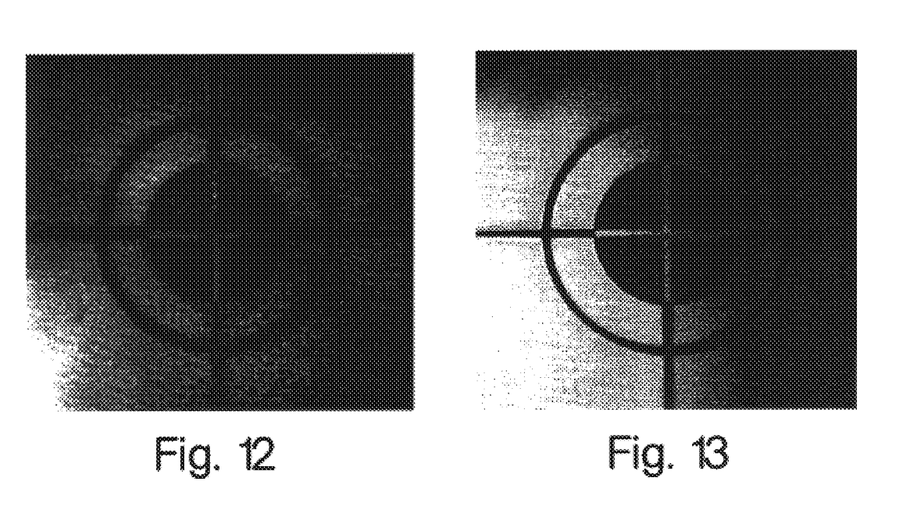
FIG. 12 is a photocopy of an optical micrograph of the pattern of FIG. 10 through the light valve during compression of the light valve.
FIG. 13 is a photocopy of a micrograph of the test pattern of FIG. 10 through the elastomeric light valve member of FIG. 2c, in an unstressed state, including a liquid adjacent contoured surface 68 that destroys total internal reflection within article 66.

Demonstration of a light valve of the type illustrated in FIGS. 2e and 2g was made. FIG. 10 is a photocopy of an optical micrograph of a test pattern used for the demonstration. FIG. 11 is an optical micrograph of the pattern of FIG. 10 covered by an unstressed light valve 66 of FIGS. 2 and FIG. 8. In the unstressed state, the light valve was in reflective mode, and the pattern was invisible. The system of FIGS. 2e and 2g was arranged, with glass plates above and below article 66. When the plates were compressed, the valve was stressed into "unblocked" form, and the pattern of FIG. 10 became visible (FIG. 12). To demonstrate the refractive index difference needed for total internal reflection to occur in article 66, the gap between contoured surface 68 and surface 76 of plate 74 that had been filled with air (FIG. 11 and 12) was filled with ethanol, changing the parameters that had produced total internal reflection, and rendering the arrangement transparent to the incident light.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method comprising:

providing a fluid in a cavity having a volume;

arranging the fluid within the cavity in a first fluid pattern;

allowing electromagnetic radiation to interact with the fluid in the first fluid pattern and to emerge from the interaction in a first identifiable electromagnetic radiation pattern comprising a plurality of pixels, each pixel defining a respective first amount of emerging radiation; and redistributing the fluid by changing the volume of the cavity so as to alter the first fluid pattern to a second fluid pattern and allowing electromagnetic radiation to interact with the fluid in the second fluid pattern and to emerge from the interaction in a second identifiable electromagnetic radiation pattern wherein at least one pixel defines a second amount of emerging radiation.

2. A method as in claim 1, wherein the fluid is at least partially opaque to the electromagnetic radiation and is contained in an assembly, the method involving arranging the at least partially opaque fluid in the assembly in the first fluid pattern including regions of the fluid and intervening regions free of the fluid;

exposing the first fluid pattern to the electromagnetic radiation and allowing a portion of the electromagnetic radiation to be blocked by the fluid while allowing another portion of electromagnetic radiation to pass through the first fluid pattern via the intervening regions and to emerge from the assembly as the first identifiable electromagnetic radiation pattern; and changing the amount of electromagnetic radiation emerging from the assembly by altering the first fluid pattern to the second fluid pattern thereby decreasing a ratio of the fluid to intervening regions free of the fluid.

3. A method as in claim 1, wherein the fluid is at least partially opaque to the electromagnetic radiation, the method comprising:

providing an assembly including the fluid contained in the cavity;

establishing the first identifiable pattern of electromagnetic radiation by arranging the fluid within the cavity in the first fluid pattern, exposing at least a portion of the assembly to electromagnetic radiation, and allowing a portion of the electromagnetic radiation to be blocked by the fluid while allowing another portion of electromagnetic radiation to pass through the assembly and to emanate from the assembly in the first electromagnetic radiation pattern;

identifying the first electromagnetic radiation pattern; and preventing emanation from the assembly of the first electromagnetic radiation pattern by altering the pattern of fluid within the cavity from the first pattern.

4. A method as in claim 3, the preventing step involving urging the fluid into the cavity thereby altering the pattern of fluid within the cavity by increasing the amount of fluid within the cavity thereby allowing a greater portion of electromagnetic radiation to be blocked by the fluid.

5. A method as in claim 4, wherein the cavity has a flexible surface, the method involving urging fluid into the cavity by altering the configuration of the flexible surface.

6. A method as in claim 4, wherein the cavity has a flexible surface, the method involving urging fluid into the cavity by altering the configuration of the elastomeric surface.

7. A method as in claim 3, comprising alternately preventing and allowing emanation, from the assembly, of the first electromagnetic radiation pattern by alternatively urging the fluid into and out of the cavity.

8. A method as in claim 7, wherein the cavity is defined in part by a surface including at least one flexible portion, the flexible portion being deformable to urge the fluid into and out of the cavity.

9. A method as in claim 7, wherein the cavity is defined in part by a surface including at least one elastomeric portion, the elastomeric portion being deformable to urge the fluid into and out of the cavity.

10. A method as in claim 1, comprising:

changing the volume of the cavity by changing the physical distribution of the fluid positioned in the cavity between a first portion of a cavity interior surface and a second portion of the cavity interior surface by moving the first portion of the cavity interior surface relative to the second portion of the cavity interior surface.

11. A method as in claim 10, comprising: changing the amount of the fluid positioned between the first portion of the cavity interior surface and the second portion of the cavity interior surface by moving the first portion of the cavity interior surface relative to the second portion of the cavity interior surface; and determining a change in electromagnetic radiation interacting with the fluid resulting from the change in the amount of the fluid positioned between the first and second portions of the cavity interior surface.

12. A method as in claim 10, wherein the cavity interior surface is flexible.

13. A method as in claim 10, wherein the cavity interior surface is elastomeric.

14. A method as in claim 10, wherein the cavity is elastomeric.

15. A method as in claim 1, wherein the fluid is at least partially opaque to the electromagnetic radiation, the method comprising:

providing a flexible assembly, at least a portion of which is defined by the fluid;

passing the electromagnetic radiation through a portion of the assembly;

changing the amount of electromagnetic radiation passing through the portion of the assembly by alternately increasing and reducing the amount of the fluid resident in the portion.

16. A method as in claim 15, involving providing an elastomeric assembly including a plurality of protrusions and indentations, the indentations of which are filled with the fluid and the protrusions of which contact a surface of the assembly, the method involving changing the amount of electromagnetic radiation passing through the portion of the assembly by alternately urging the protrusions, at the portion, against the surface and removing force applied to the protrusions thereby alternately reducing and increasing the amount of fluid resident in the indentations at the portion.

17. A method as in claim 1, comprising:

providing a flexible assembly, at least a portion of which is defined by the fluid;

introducing the electromagnetic radiation into a portion of the assembly and allowing the introduced electromagnetic radiation to interact with the fluid;

allowing electromagnetic radiation to emanate from the portion of the assembly as the first electromagnetic radiation pattern;

changing the amount of electromagnetic radiation emanating from the portion of the assembly, thereby changing the first electromagnetic radiation pattern to the second electromagnetic radiation pattern by alternately increasing and reducing the amount of the fluid resident in the portion.

18. A method as in claim 17, wherein the assembly is an elastomeric assembly.

19. A method as in claim 17, wherein the fluid is at least partially opaque to the electromagnetic radiation, the method involving increasing and reducing the amount of fluid resident in the portion thereby, respectively, decreasing and increasing the amount of electromagnetic radiation emanating from the portion of the assembly.

20. A method as in claim 17, wherein the fluid is a fluorescent or phosphorescent fluid, the method involving alternately increasing and reducing the amount of fluid resident in the portion thereby, respectively, alternately increasing and reducing the amount of electromagnetic radiation emanating from the portion of the assembly.

21. A method as in claim 20, wherein the assembly is elastomeric.

22. A method as in claim 21, wherein the elastomeric assembly includes a plurality of protrusions and indentations and the fluid is arranged in a pattern defined by the indentations.

23. A method comprising:
   establishing a path of electromagnetic radiation in a portion of a flexible article, the flexible article including a plurality of indentations and protrusions, and allowing the path of electromagnetic radiation to pass through the portion of the flexible article in a first amount;
   changing the amount of electromagnetic radiation passing through the portion of the flexible article from the first amount to a second amount by changing the configuration of the portion of the flexible article; and
   at least in part blocking the path of electromagnetic radiation thereby reducing the electromagnetic radiation passing through the flexible article from the first amount to the second amount.

24. A method as in claim 23, wherein the flexible article has at least one contoured surface including a plurality of indentations and protrusions, the contoured surface positioned adjacent a second surface of a second article such that the protrusions contact the second surface, the method comprising:
   passing the electromagnetic radiation through the contoured surface; and
   changing the amount of electromagnetic radiation passing through the contoured surface by alternately urging the contoured surface against the second surface and releasing the contoured surface from the second surface.

25. A method comprising:
   establishing a path of electromagnetic radiation in a portion of a flexible article, the flexible article including a plurality of indentations and protrusions, and allowing the path of electromagnetic radiation to pass through the portion of the flexible article in a first amount;
   changing the amount of electromagnetic radiation passing through the portion of the flexible article from the first amount to a second amount by changing the configuration of the portion of the flexible article; and
   changing the amount of the electromagnetic radiation passing through the flexible article from the first amount to the second amount by at least in part blocking the path of electromagnetic radiation.

26. A method as in claim 25, wherein the flexible article has at least one contoured surface including a plurality of indentations and protrusions, the contoured surface positioned adjacent a second surface of a second article such that the protrusions contact the second surface, the method comprising:
   passing the electromagnetic radiation through the contoured surface; and
   changing the amount of electromagnetic radiation passing through the contoured surface by alternately urging the contoured surface against the second surface and releasing the contoured surface from the second surface.

27. A method as in claim 25, comprising at least in part blocking the path of electromagnetic radiation by increasing an amount of a fluid at least partially opaque to the electromagnetic radiation in the path.

28. A method as in claim 27, comprising changing the amount of electromagnetic radiation passing through the flexible article by changing a force applied to the flexible article.

29. A method as in claim 28, wherein the article is an elastomeric article and the method involves alternately increasing and decreasing a force applied to the elastomeric article thereby alternately increasing and decreasing the amount of electromagnetic radiation passing through the article.

30. A system comprising:
   an at least partially opaque fluid in a volume of a container constructed and arranged to be exposed to electromagnetic radiation and to alter passage through the container of the electromagnetic radiation to provide an identifiable electromagnetic radiation pattern comprising a plurality of pixels, each pixel defining an amount of emerging radiation;
   a flexible article associated with the container, the flexible article including a plurality of indentations and protrusions; and
   a modulator associated with the flexible article and constructed and arranged to alter the volume of the container.

31. A system as in claim 30, further comprising a source of electromagnetic radiation directable at the at least partially opaque fluid.

32. A system as in claim 31, further comprising a detector of electromagnetic radiation emanating from the container.

33. A system comprising:
   a flexible article constructed and arranged to be exposed to electromagnetic radiation and to partially reflect the electromagnetic radiation from a surface of the article and partially pass electromagnetic radiation through the article, the surface of the flexible article comprising a corner cube array contoured surface; and
   a modulator associated with the article and constructed and arranged to alter the conformation of the surface of the article.

34. A system as in claim 33, further comprising a source of the electromagnetic radiation directable at the flexible article.

35. A system as in claim 34, further comprising a detector of electromagnetic radiation emanating from the flexible article.

36. A method comprising:
   establishing a path of electromagnetic radiation within a corner cube array contoured surface of a flexible article and allowing the path of electromagnetic radiation to reflect from the contoured surface of the flexible article in a first amount, the flexible article being free of contact with a fluid; and
   changing the amount of electromagnetic radiation reflecting from the contoured surface of the flexible article from the first amount to a second amount by changing the configuration of the contoured surface of the flexible article.

37. A method as in claim 36, comprising reflecting the electromagnetic radiation from the contoured surface of the flexible article and allowing the reflected electromagnetic radiation to emanate from the flexible article as the path in the first amount.

38. A method as in claim 37, comprising changing the first amount of electromagnetic radiation to the second amount by changing the configuration of the contoured surface of the flexible article.

39. A method as in claim 37, comprising reducing the amount of reflected electromagnetic radiation by deforming the contoured surface of the flexible article.

40. A system comprising:
   a flexible article having a surface including a plurality of indentations and protrusions;
   a second surface of a second article positioned adjacent the plurality of protrusions;
   a variable volume defined by the second surface and the plurality of indentations; and
   an at least partially opaque liquid filling the volume, wherein the flexible article is transparent.

41. A system as in claim 40, further comprising a source of electromagnetic radiation, for directing electromagnetic radiation towards the surface of the flexible article.

42. A system as in claim 40, further comprising a vacuum in communication with the volume, for urging the second surface against the surface of the flexible article thereby compressing the plurality of protrusions.

43. A system as in claim 40, further comprising a modulator associated with the flexible article constructed and arranged to alter the conformation of at least one of the plurality of protrusions.

44. A system comprising:
   a flexible article having a surface including a plurality of indentations and protrusions, the surface comprising a corner cube array contoured surface, the article being capable of reflecting electromagnetic radiation;
   a second surface of a second article positioned adjacent the plurality of protrusions; and
   a variable volume defined by the second surface and the plurality of indentations, the volume being free of a liquid.

45. A system as in claim 44, further comprising a source of electromagnetic radiation for directing electromagnetic radiation towards the article.

46. A system as in claim 44, wherein the flexible article is transparent.

* * * * *